US007096110B2

(12) United States Patent
Wakairo

(10) Patent No.: US 7,096,110 B2
(45) Date of Patent: Aug. 22, 2006

(54) ELECTRONIC CONTROL APPARATUS FOR VEHICLE AND CONTROL METHOD FOR VEHICLE

(75) Inventor: Masahiko Wakairo, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/985,994

(22) Filed: Nov. 12, 2004

(65) Prior Publication Data

US 2005/0107964 A1 May 19, 2005

(30) Foreign Application Priority Data

Nov. 19, 2003 (JP) ............................ 2003-388735

(51) Int. Cl.
*G06F 19/00* (2006.01)
*G06G 7/70* (2006.01)

(52) U.S. Cl. ...................................... 701/101; 701/112

(58) Field of Classification Search ................ 701/101, 701/103, 104, 112, 114, 115
See application file for complete search history.

(56) References Cited

U.S. PATENT DOCUMENTS 4,723,523 A * 2/1988 Kataoka et al. ............. 123/491
4,909,225 A * 3/1990 Gonze et al. ............... 123/494
5,579,743 A * 12/1996 Kadowaki .............. 123/568.24
5,605,119 A * 2/1997 Masuda et al. ......... 123/65 PE
6,083,369 A * 7/2000 Tanigawa ................... 204/424
6,415,210 B1 * 7/2002 Hozuka et al. ............... 701/29
6,853,295 B1 * 2/2005 Takebe et al. ......... 340/426.11
2001/0037168 A1 * 11/2001 Hozuka et al. ............... 701/29
2002/0043243 A1 * 4/2002 Majima ...................... 123/399
2004/0012503 A1 * 1/2004 Takebe et al. ......... 340/870.39
2005/0053470 A1 * 3/2005 Yamazaki et al. ....... 417/44.11
2005/0172920 A1 * 8/2005 Machida ................. 123/90.15
2005/0236213 A1 * 10/2005 Hosoya ...................... 180/284

FOREIGN PATENT DOCUMENTS

JP 2003-13810 A 1/2003

* cited by examiner

*Primary Examiner*—John T. Kwon
(74) *Attorney, Agent, or Firm*—Foley & Lardner LLP

(57) ABSTRACT

In the case where it is diagnosed whether or not the leakage occurs in a fuel vapor purge system from a standby time has elapsed after an engine operation was stopped, the power supply to processing circuits unnecessary for the leakage diagnosis is shut off, thereby suppressing the power consumption during the engine operation stop.

17 Claims, 6 Drawing Sheets

ELECTRONIC CONTROL APPARATUS FOR VEHICLE AND CONTROL METHOD FOR VEHICLE

FIELD OF THE INVENTION

The present invention relates to an electronic control apparatus for a vehicle and a control method for a vehicle, and in particular, to a technique for performing the process, such as the diagnosis or the like, after an operation of an engine is stopped.

DESCRIPTION OF THE ART

Japanese Unexamined Patent Publication No. 2003-013810 discloses a diagnosis apparatus for diagnosing whether or not the leakage occurs in a fuel vapor purge system equipped to a vehicle engine.

In this diagnosis apparatus, a diagnosis section in the fuel vapor purge system is shielded by valves after an engine operation has been stopped, and the diagnosis section is supplied with air by an air pump to be pressurized. Then, it is diagnosed whether or not the leakage occurs in the diagnosis section, based on a driving load of the air pump during the pressurization.

In the case where the diagnosis section inclusive of a fuel tank is pressurized by the air pump, if the fuel vapor is generated in the fuel tank, since a pressure in the diagnosis section is changed by an influence of the fuel vapor generation, the accuracy of leakage diagnosis is lowered.

Therefore, it is preferable to standby until the fuel vapor generation is finished after the engine operation has been stopped, and then to perform the leakage diagnosis.

However, since an operation of a dynamo which is driven by the engine is stopped during the stop of engine operation, a battery charge is not performed.

On the other hand, if a standby time until the start of the leakage diagnosis after the stop of engine operation and a leakage diagnosis time are long, the power consumption in an electronic control apparatus, which performs various controls including the leakage diagnosis, is made higher.

Accordingly, if the leakage diagnosis is performed after the standby until the fuel vapor generation is finished after the engine operation has been stopped, the battery is wasted, and consequently, it becomes hard to start the next engine operation.

SUMMARY OF THE INVENTION

The present invention has an object to enable the execution of the process to be performed after an engine operation is stopped, while suppressing the waste of a battery during the engine operation is stopped.

In order to achieve the above object, according to the present invention, the power supply to certain processing circuits of a plurality of processing circuits included in an electronic control apparatus is shut off after an engine operation is stopped.

The other objects and features of this invention will become understood from the following description with reference to the accompanying drawings.

DESCRIPTION OF EMBODIMENTS

Figure 1:
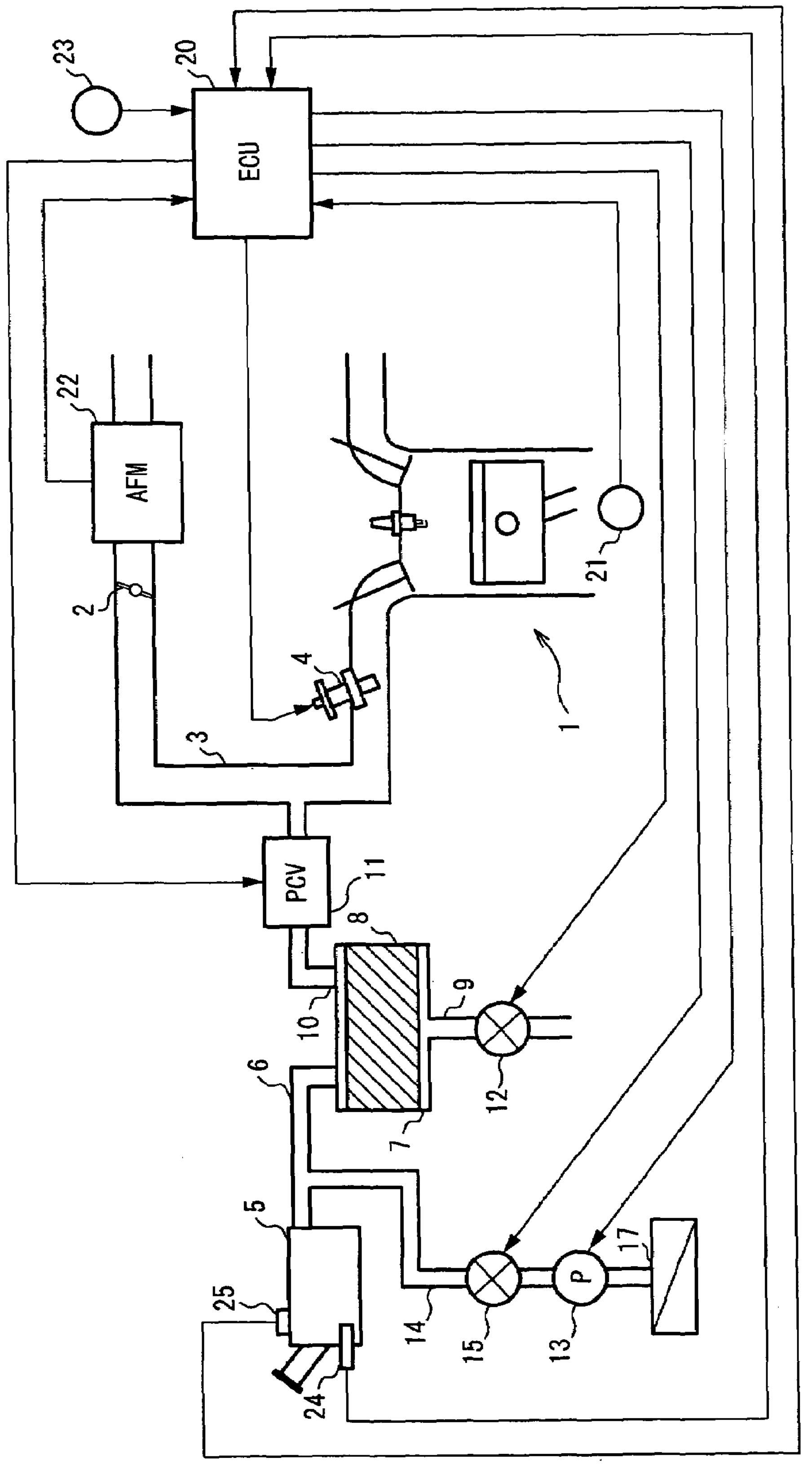
FIG. 1 is a diagram showing a system configuration of an engine in an embodiment.

FIG. 1 shows a system configuration of an engine in an embodiment.

Engine 1 is a gasoline engine installed in a vehicle (not shown in the figure).

A throttle valve 2 is disposed in an intake pipe 3 of engine 1, and an intake air amount of engine 1 is controlled by throttle valve 2.

A fuel injection valve 4 is disposed to an intake port of each cylinder.

Fuel injection valve 4 is opened based on an injection pulse signal output from an engine control unit 20, to inject fuel.

Engine 1 is provided with a fuel vapor purge system.

The fuel vapor purge system is for adsorbing the fuel vapor generated in a fuel tank 5 to a canister 7 via an evaporation passage 6, and for detaching the fuel vapor adsorbed to canister 7, to supply the detached fuel vapor to intake pipe 3 of engine 1.

Canister 7 is a container filled with the adsorbent 8 such as activated carbon.

Further, a new air inlet 9 is formed to canister 7, and a purge passage 10 is led out from canister 7.

Purge passage 10 is connected to intake pipe 3 on the downstream side of throttle valve 2 via a purge control valve 11.

Purge control valve 11 is opened based on a purge control signal output from engine control unit 20.

When a purge permission condition is established during an operation of engine 1, purge control valve 11 is controlled to open. When purge control valve 11 is controlled to open, an intake negative pressure of engine 1 acts on canister 7, so that the fuel vapor adsorbed to canister 7 is detached.

Purged gas inclusive of the fuel vapor detached from canister 7 passes through purge passage 10 to be sucked into intake pipe 3.

Engine control unit 20 incorporates therein a microcomputer comprising a CPU, a ROM, a RAM, an A/D converter and an input/output interface.

Engine control unit 20 receives detection signals from various sensors, to output the injection pulse signal and the purge control signal based on these detection signals.

As the various sensors, there are provided a crank angle sensor 21 detecting a crank angle, an air flow meter 22 measuring the intake air amount of engine 1, a vehicle speed sensor 23 detecting a vehicle speed, a pressure sensor 24 detecting a pressure in fuel tank 5, and a fuel level sensor 25 detecting a fuel level in fuel tank 5.

Here, engine control unit 20 diagnoses whether or not the leakage occurs in the fuel vapor purge system after the operation of engine 1 has been stopped.

For performing the leakage diagnosis, a drain cut valve 12 for opening/closing new air inlet 9 of the canister 7 is disposed and also an air pump 13 for sending air into evaporation passage 6 is disposed.

A discharge port of air pump 13 is connected to evaporation passage 6 via an air supply pipe 14. A check valve 15 is disposed in the halfway of air supply pipe 14.

Further, an air cleaner 17 is disposed on the inlet port side of air pump 13.

When a diagnosis condition is established after the operation of engine 1 has been stopped, engine control unit 20 controls purge control valve 11 and drain cut valve 12 to close. As a result of the valve closing control, a diagnosis section inclusive of fuel tank 5, evaporation passage 6, canister 7 and purge passage 10 on the upstream of purge control valve 11, is shielded.

Next, engine control unit 20 supplies the air to the diagnosis section by air pump 13, to pressurize the diagnosis section.

Then, engine control unit 20 detects the pressure in fuel tank 5 or a load of air pump 13 for when the diagnosis section is pressurized, to diagnose whether or not the leakage occurs in the diagnosis section based on the pressure or the load.

Note, it is possible to diagnose whether or not the leakage occurs, based on a change in pressure during the pressurization or the pressure leakage out of the diagnosis section after the pressurization has been stopped.

Further, it is also possible to depressurize the diagnosis section by the air pump, to thereby diagnose whether or not the leakage occurs in the diagnosis section based on the change in pressure due to the depressurization.

Furthermore, it is also possible to diagnose whether or not the leakage occurs, based on the process in which a fuel vapor pressure which has been raised up to the time just before the stop of engine operation is lowered after the stop of engine operation.

Figure 2:
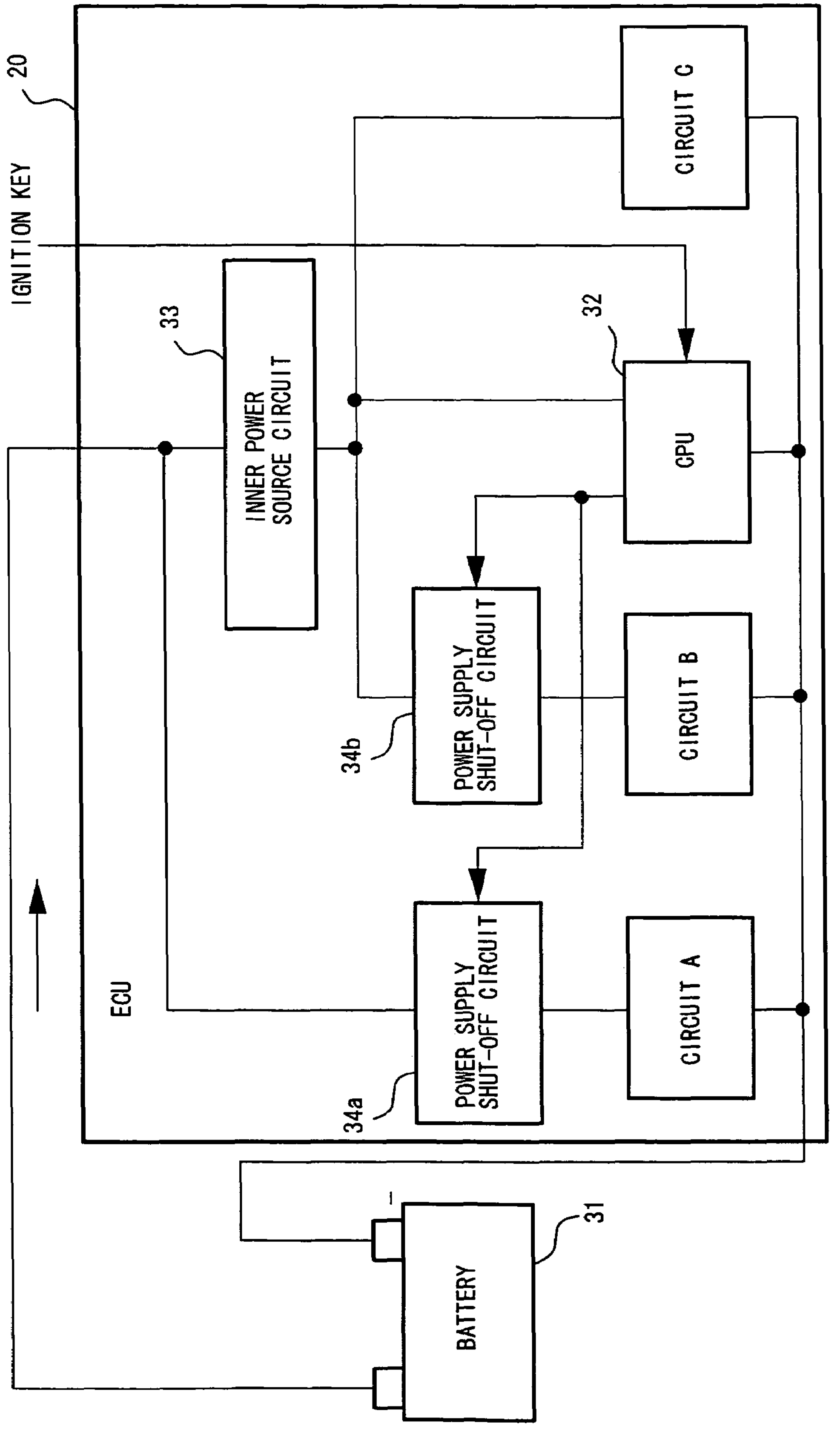
FIG. 2 is a circuit diagram of an engine control unit in a first embodiment.

FIG. 2 shows a configuration of engine control unit 20.

Engine control unit 20 is operated by a battery 31 installed in the vehicle as a power source.

Battery 31 is charged by an alternator which is driven by engine 1.

Battery 31 is connected to a CPU 32 and processing circuits A to C included in engine control unit 20 directly or via an inner power source circuit 33.

In processing circuits A to C shown in the figure, processing circuits A and B are processing circuits unnecessary for the leakage diagnosis, whereas processing circuit C is a processing circuit for monitoring the pressure in fuel tank 5, which is detected by pressure sensor 24, and is necessary for the leakage diagnosis as well as CPU 32.

Here, power supply shut-off circuits 34*a* and 34*b* for shutting off the power supply to processing circuits A and B are disposed to power supply lines of processing circuits A and B.

Figure 3:
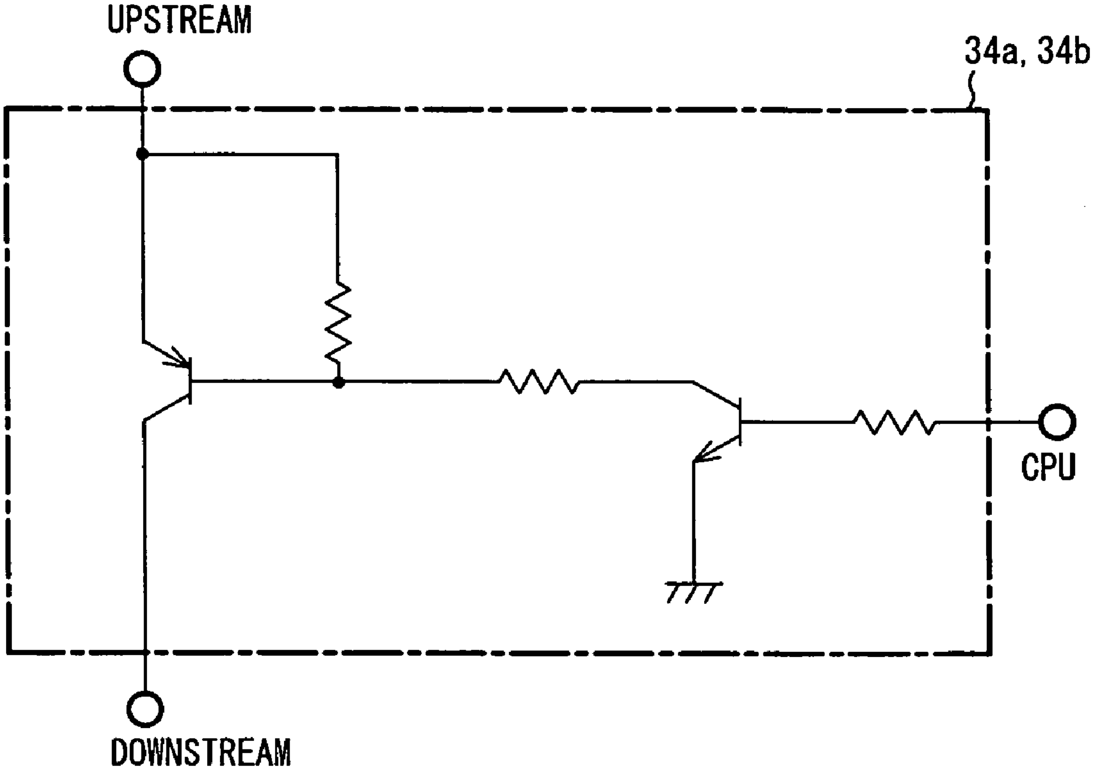
FIG. 3 is a circuit diagram showing a power supply shut-off circuit in the first embodiment.

As shown in FIG. 3, power supply shut-off circuits 34*a* and 34*b* each comprise a transistor Tr which is controlled to turn ON or OFF by CPU 32, so that the power supply to processing circuits A and B can be controlled by CPU 32.

CPU 32 receives an ON/OFF signal for an ignition key. Then, when the ignition key is turned OFF and then the operation of engine 1 is stopped, CPU 32 controls power supply shut-off circuits 34*a* and 34*b*, to shut off the power supply to processing circuits A and B.

The leakage diagnosis is performed after the operation of engine 1 is stopped. However, in this leakage diagnosis, processing circuits A and B are not used. Therefore, by stopping the power supply to processing circuits A and B among the processing circuits included in engine control unit 20, the power consumption of engine control unit 20 after the operation stop of engine 1, is suppressed.

Figure 4:
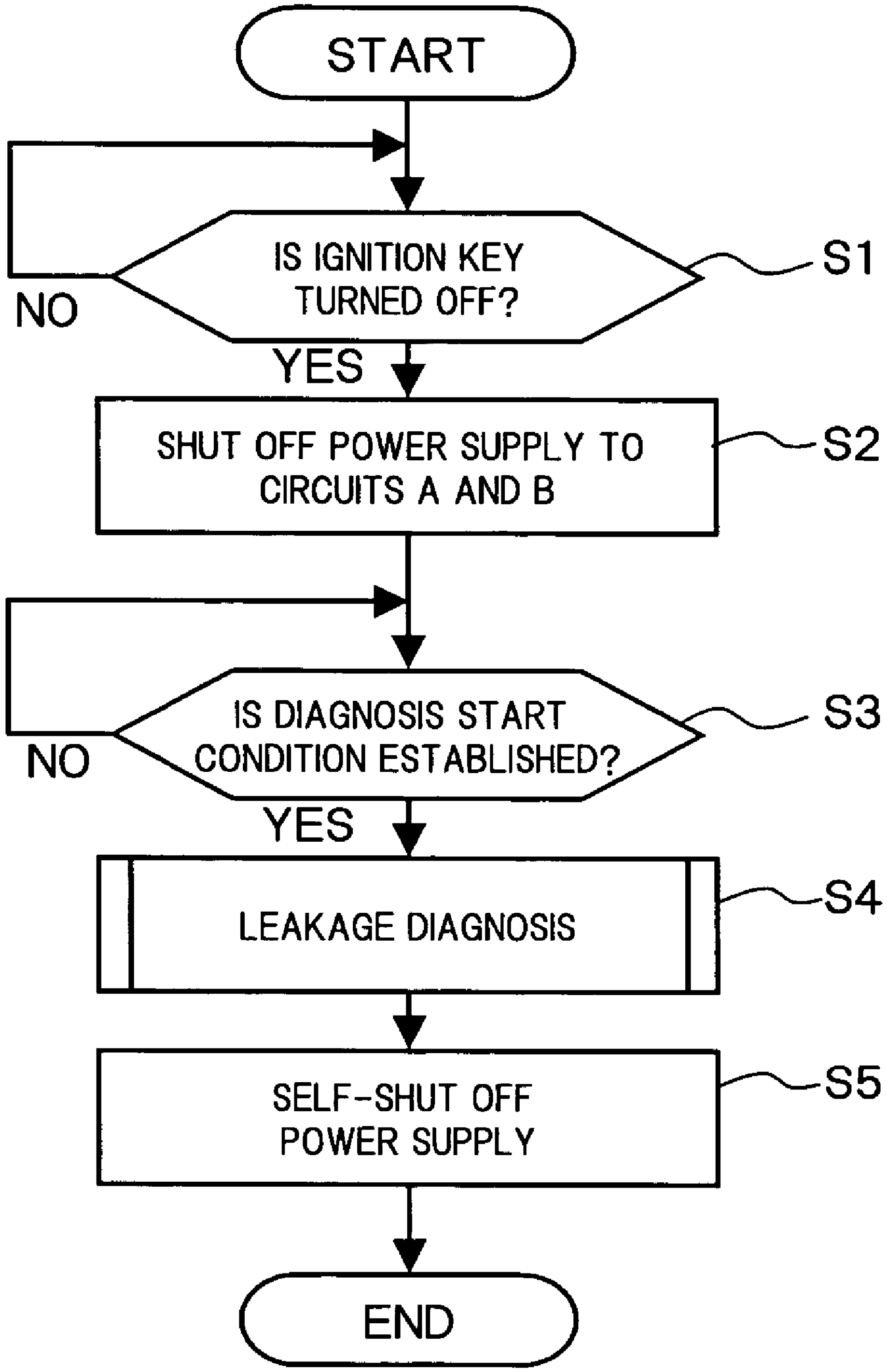
FIG. 4 is a flowchart showing a power supply control and a leakage diagnosis control in the first embodiment.

A flowchart of FIG. 4 shows a control of power supply shut-off circuits 34*a* and 34*b* and the leakage diagnosis.

In step S1, it is judged whether or not the ignition key is turned OFF and then the operation of engine 1 is stopped.

If the ignition key is turned OFF and then the operation of engine 1 is stopped, control proceeds to step S2, where power supply shut-off circuits 34*a* and 34*b* are controlled so that the power supply to processing circuits A and B is shut off.

In next step S3, it is judged whether or not a leakage diagnosis start condition is established.

The leakage diagnosis start condition includes a condition that drain cut valve 12 and air pump 13 are in normal states, a condition that a standby time after the operation stop of engine 1 has elapsed and accordingly the fuel evaporation in fuel tank 5 is finished, and the like.

However, the constitution may be such that the leakage diagnosis is performed immediately after the operation stop of engine 1.

When the leakage diagnosis start condition is established, control proceeds to step S4, where the leakage diagnosis is executed.

In the above leakage diagnosis, firstly, purge control valve 11 and drain cut valve 12 are controlled to close, so that the diagnosis section inclusive of fuel tank 5, evaporation passage 6, canister 7, and purge passage 10 on the upstream of purge control valve 11, is shielded.

Next, the diagnosis section is supplied with the air by air pump 13 to be pressurized, and the pressure in fuel tank 5 (or the load of air pump 13) is periodically detected during the pressurization and/or after the stop of pressurization.

Then, it is diagnosed whether or not the leakage occurs in the diagnosis section, based on the pressure in fuel tank 5 (or the load of air pump 13).

When the leakage diagnosis is finished, control proceeds to step S5, where engine control unit 20 self-shuts off the power supply.

Figure 5:
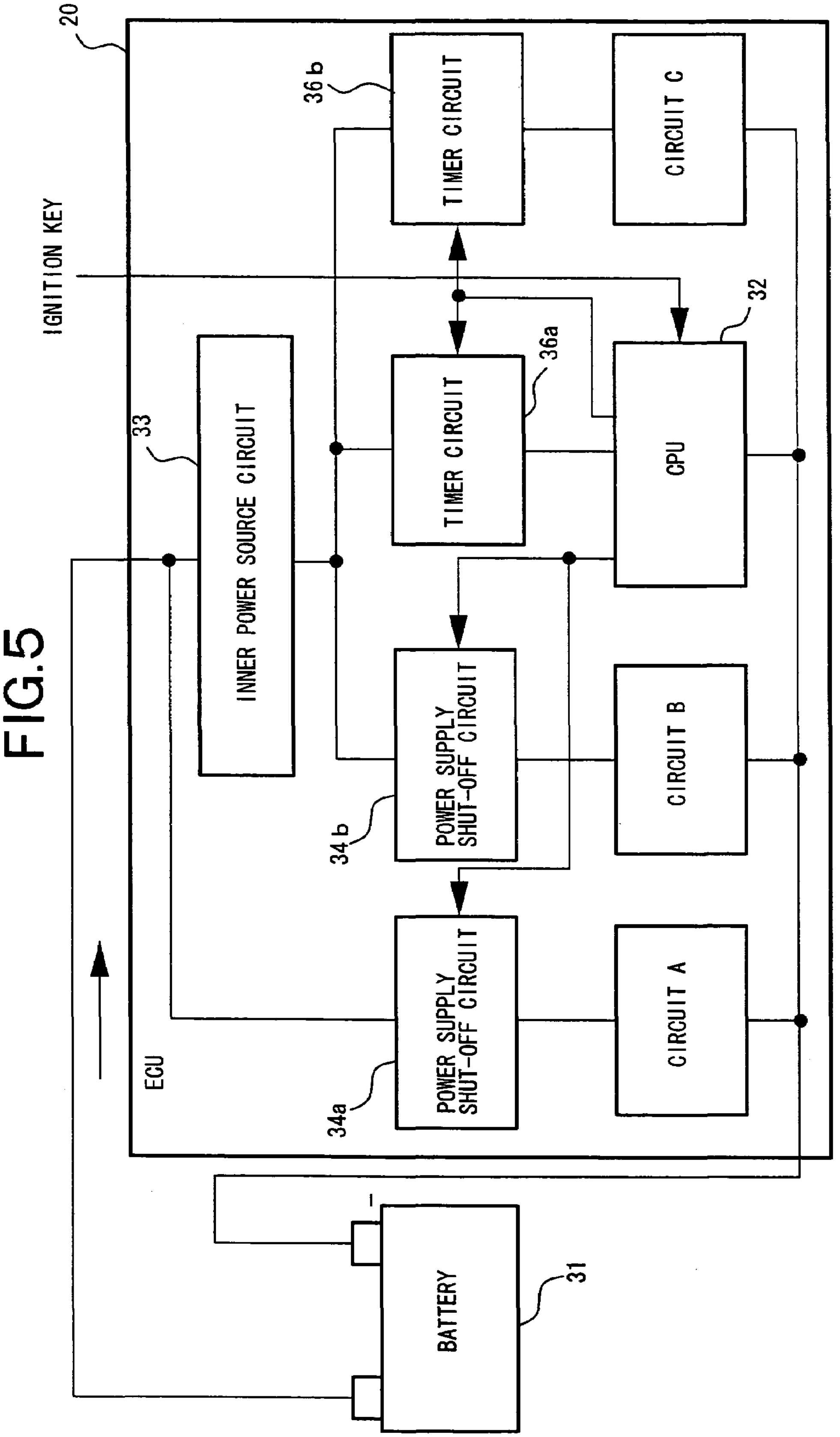
FIG. 5 is a circuit diagram of the engine control unit in a second embodiment.

FIG. 5 shows a second embodiment of engine control unit 20.

In engine control unit 20 shown in FIG. 5, a timer circuit 36*a* is added to a power supply line of CPU 32 and a timer circuit 36*b* is added to a power supply line of processing circuit C which is necessary for leakage diagnosis.

When the ignition key is turned OFF and the operation of engine 1 is stopped, CPU 32 controls power supply shut-off circuits 34*a* and 34*b* to shut off the power supply to processing circuits A and B which are not used for the leakage diagnosis, and also sets to timer circuits 36*a* and 36*b* standby times for reactivating CPU 32 and processing circuit C, to once stop the power supply to CPU 32 and processing circuit C.

Timer circuits 36*a* and 36*b* each measure the set standby time, and when the standby time has elapsed, resume the power supply to CPU 32 and processing circuit C.

CPU 32 to which the power supply has been resumed, performs the leakage diagnosis using processing circuit C, and when the leakage diagnosis is finished, self-shuts off the power supply to the entirety of engine control unit 20.

According to the above embodiment, even if the standby time until the leakage diagnosis is started after the operation stop of engine 1 is long, only timer circuit 36*a* and 36*b* operate during the standby time, and the power supply to CPU 32 and processing circuits A to C, whose power consumption is relatively large, is stopped. Therefore, the power consumption during the standby time is suppressed.

Note, the constitution may be such that, in place of timer circuits 36*a* and 36*b*, a microcomputer of low power consumption type is disposed, so that the measurement of standby time and the resume control of the power supply to CPU 32 and processing circuit C are performed by this microcomputer of low power consumption type.

Figure 6:
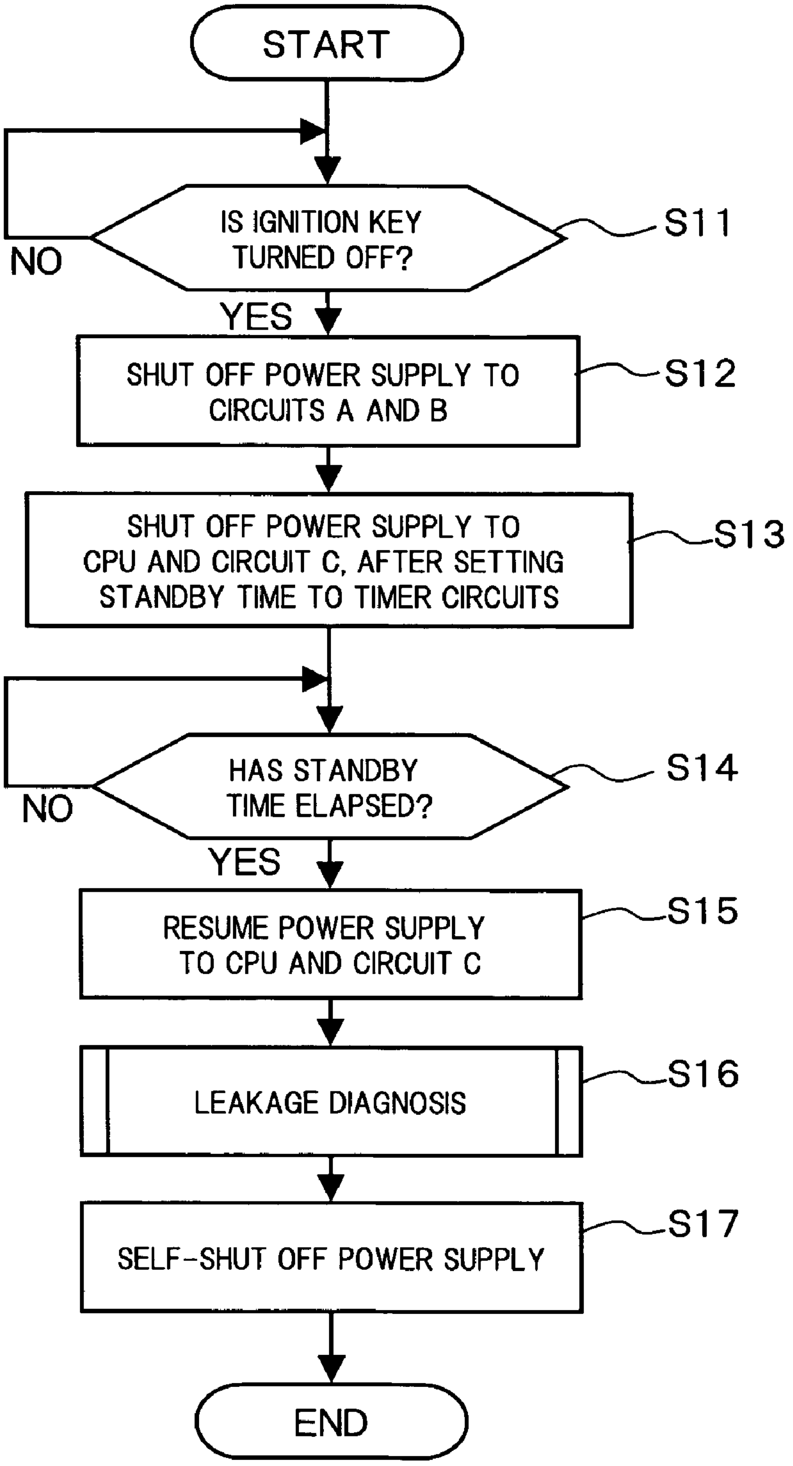
FIG. 6 is a flowchart showing the power supply control and the leakage diagnosis control in the second embodiment.

A flowchart of FIG. 6 shows the controls of power supply shut-off circuits 34*a* and 34*b*, and timer circuits 36*a* and 36*b*, and the leakage diagnosis.

In step S11, it is judged whether or not the ignition key is turned OFF and then the operation of engine 1 is stopped.

If the ignition key is turned OFF and then the operation of engine 1 is stopped, control proceeds to step S12, where power supply shut-off circuits 34*a* and 34*b* are controlled so that power supply to processing circuits A and B is shut off.

In next step S13, the standby time until the start of leakage diagnosis is set to timer circuits 36*a* and 36*b*, and then the power supply to CPU 32 and processing circuit C is once stopped.

Note, the standby time may be a fixed time, but is preferable to be variably set according to a fuel temperature at the time of engine operation stop or engine operating conditions immediately before the engine operation stop.

In step S14, the control is held until the standby time is measured by each of timer circuits 36*a* and 36*b*, and if the standby time has elapsed, control proceeds to step S15.

In step 15, the power supply to CPU 32 and processing circuit C is resumed, and in next step S16, CPU 32 and processing circuit C execute the leakage diagnosis.

Then, if the leakage diagnosis is finished, control proceeds to step S17, where engine control unit 20 self-shuts off the power supply.

Note, the process performed after the operation stop of engine 1 is not limited to the leakage diagnosis in the fuel vapor purge system. In other processes, by stopping the power supply to the processing circuits which are unnecessary for such processes, the power consumption during the engine operation stop can be suppressed.

The entire contents of Japanese Patent Application No. 2003-388735 filed on Nov. 19, 2003, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

What I claim:

1. An electronic control apparatus using a battery as a power source, for a vehicle in which an engine is installed, comprising:

a plurality of processing circuits;

power supply shut-off circuits shutting off the power supply to certain processing circuits of said plurality of processing circuits; and a control circuit controlling said power supply shut-off circuits based on an ON/OFF signal for an ignition key, to shut off the power supply to said certain processing circuits after an operation of said engine is stopped by means of turning off said ignition key.

2. An electronic control apparatus for a vehicle according to claim 1, wherein said certain processing circuits are unnecessary for the process to be performed after the operation of said engine is stopped.

3. An electronic control apparatus for a vehicle according to claim 2, wherein said process to be performed after the operation of said engine is stopped, is started from an elapse of a standby time after the operation of said engine was stopped.

4. An electronic control apparatus for a vehicle according to claim 3, further comprising;

timer circuits shutting off the power supply to the processing circuit, which is used for said process to be performed after the operation of said engine is stopped, of said plurality of processing circuits, during a period until said standby time has elapsed after the operation of said engine was stopped, and resuming the power supply at the time when said standby time has elapsed.

5. An electronic control apparatus for a vehicle according to claim 2, wherein said engine is provided with a fuel vapor purge system, and said process to be performed after the operation of said engine is stopped, is the process of diagnosing whether or not the leakage occurs in said fuel vapor purge system.

6. An electronic control apparatus for a vehicle according to claim 5, wherein it is diagnosed whether or not the leakage occurs in said fuel vapor purge system, based on a pressure in a diagnosis section detected by a pressure sensor.

7. An electronic control apparatus for a vehicle according to claim 6, wherein said plurality of processing circuits includes a monitoring circuit monitoring a signal output from said pressure sensor, and said power supply shut-off circuits shut off the power supply to the processing circuits other than said monitoring circuit, of said plurality of processing circuits.

8. An electronic control apparatus for a vehicle according to claim 2, wherein said electronic control apparatus self-shuts off the power supply from said battery at the time when the process to be performed after the operation of said engine is stopped, is completed.

9. An electronic control apparatus using a battery as a power source, for a vehicle in which an engine is installed, comprising:

a plurality of processing means;

power shut-off means for shutting off the power supply to certain processing means of said plurality of processing means; and control means for controlling said power shut-off means based on an ON/OFF signal for an ignition key, to shut off the power supply to said certain processing means after an operation of said engine is stopped by means of turning off said ignition key.

10. A control method of using a plurality of processing circuits which uses a battery as a power source, for a vehicle in which an engine is installed, comprising the steps of:

receiving an ON/OFF signal for an ignition key; and judging whether or not an operation of said engine is stopped, based on the ON/OFF signal for said ignition keys, when it is judged that the operation of said engine is stopped, shutting off the power supply to certain processing circuits of said plurality of processing circuits; and using the processor circuit, other than said certain processing circuits, of said plurality of processing circuits, to execute a process to be performed after the operation of said engine is stopped.

11. A control method for a vehicle according to claim 10, wherein said step of shutting off the power supply to said certain processing circuits shuts off the power supply to the processing circuits unnecessary for the process to be performed after the operation of said engine is stopped.

12. A control method for a vehicle according to claim 10, wherein said step of executing the process to be performed after the operation of said engine is stopped, comprises the steps of:

measuring an elapse of a standby time after the operation stop of said engine; and starting the process to be performed after the operation of said engine is stopped, after said standby time has elapsed.

13. A control method for a vehicle according to claim 10, wherein said step of executing the process to be performed after the operation of said engine is stopped, further comprises the steps of:

shutting off the power supply to the processing circuit, which is used for the process to be performed after the operation of said engine is stopped, during a period until said standby time has elapsed after the operation of said engine was stopped; and resuming the power supply to the processing circuit, which is used for the process to be performed after the operation of said engine is stopped, at the time when said standby time has elapsed.

14. A control method for a vehicle according to claim 10, wherein said engine is provided with a fuel vapor purge system, and said step of executing the process to be performed after the operation of said engine is stopped, comprises the step of diagnosing whether or not the leakage occurs in said fuel vapor purge system after the operation of said engine is stopped.

15. A control method for a vehicle according to claim 14, wherein said step of diagnosing whether or not the leakage occurs in said fuel vapor purge system, comprises the steps of:

detecting a pressure in a diagnosis section in said fuel vapor purge system; and diagnosing whether or not the leakage occurs based on the pressure in said diagnosis section.

16. A control method for a vehicle according to claim 15, wherein said plurality of processing circuits includes a monitoring circuit monitoring the pressure in said diagnosis section, and said step of shutting off the power supply comprises the step of shutting off the power supply to the processing circuits other than said monitoring circuit, of said plurality of processing circuits.

17. A control method for a vehicle according to claim 10, further comprising the step of self-shutting off the power supply from said battery at the time when the process to be performed after the operation of said engine is stopped, is completed.

* * * * *